United States Patent [19]

Bockewitz

[11] Patent Number: 4,998,749

[45] Date of Patent: Mar. 12, 1991

[54] SUSPENSION FOR SMOOTH RIDE WITH GOOD HANDLING CONTROL OF HEAVY LOAD VEHICLES

[76] Inventor: Leland Bockewitz, P.O. Box 487, Morrisonville, Ill. 62546

[21] Appl. No.: 356,732

[22] Filed: May 25, 1989

[51] Int. Cl.$^5$ .................. B60G 11/46; F16F 1/26
[52] U.S. Cl. ........................... 280/712; 267/268; 267/271; 403/61
[58] Field of Search ............. 280/718, 720, 712; 267/31, 32, 262, 268, 271; 403/62

[56] References Cited

U.S. PATENT DOCUMENTS

| | | | |
|---|---|---|---|
| 1,998,437 | 4/1935 | Bijur | 267/268 |
| 2,299,392 | 10/1942 | Johnson et al. | 267/268 |
| 2,684,257 | 7/1954 | Roethel | 403/61 |
| 3,697,031 | 10/1972 | Glickman et al. | 403/61 |
| 3,870,336 | 3/1975 | Bilas | 280/712 |
| 4,068,961 | 1/1978 | Ebner et al. | 403/61 |
| 4,363,460 | 12/1982 | Carroll | 248/415 |
| 4,397,478 | 8/1983 | Jensen et al. | 280/718 |
| 4,753,454 | 6/1988 | Woehler | 280/661 |

FOREIGN PATENT DOCUMENTS 45409  3/1985  Japan ........................... 267/262

Primary Examiner—Charles A. Marmor
Assistant Examiner—Karin Tyson
Attorney, Agent, or Firm—Edwin E. Greigg

[57] ABSTRACT

An improved air spring suspension system which includes an air spring on each front spring of a vehicle. The air spring is secured juxtaposed the rear end suspension of each front leaf spring and includes slide pads on each surface of the rear support links. The slide pads and rear end of the springs are secured by a bolt having a self-locking nut and the support links have edges within which the slide pads slide in order to prevent side-to-side movement.

5 Claims, 2 Drawing Sheets

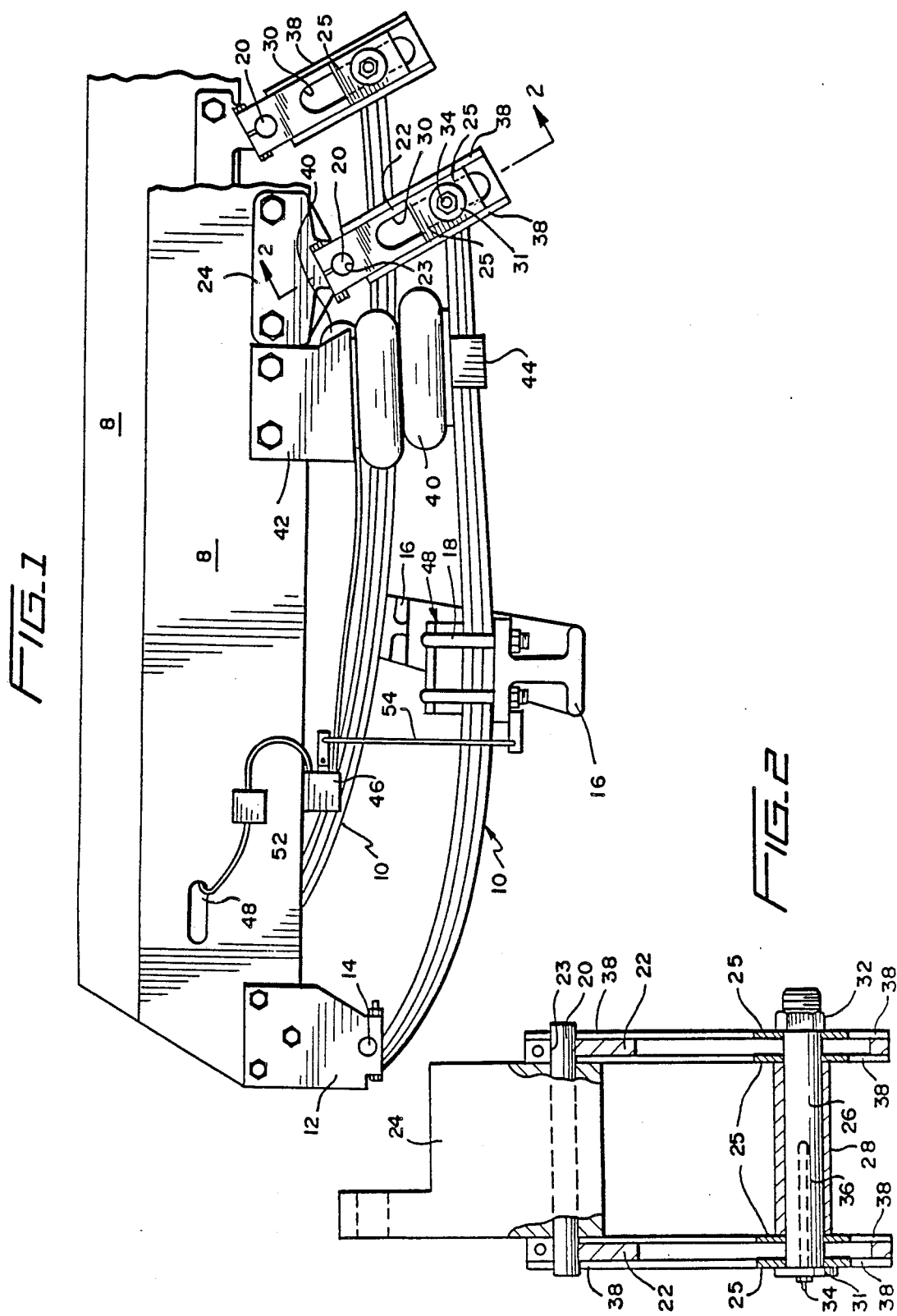

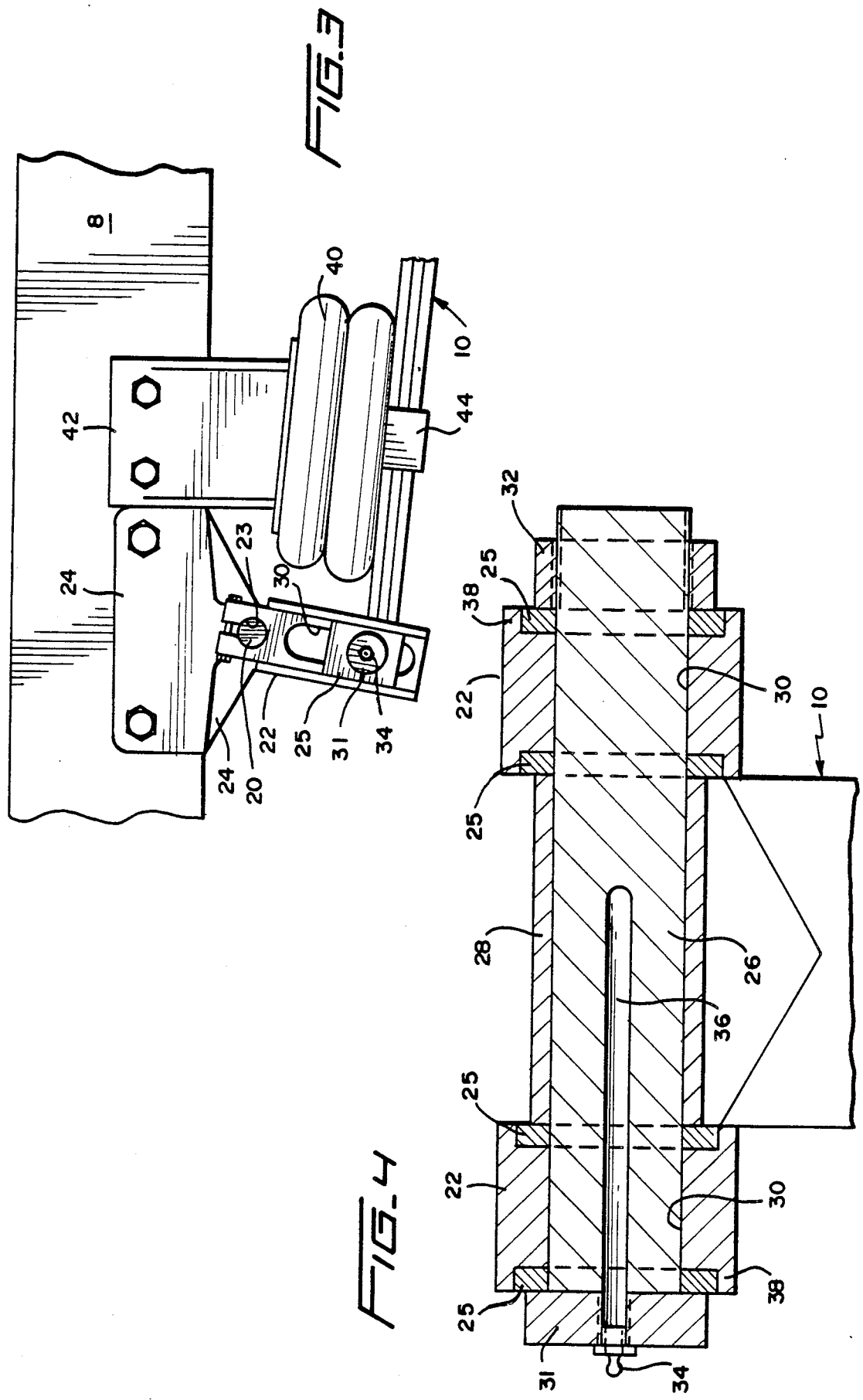

SUSPENSION FOR SMOOTH RIDE WITH GOOD HANDLING CONTROL OF HEAVY LOAD VEHICLES

BACKGROUND OF THE INVENTION

This invention is directed to leaf spring-air spring combination for supporting a front end of a vehicle which provides a softer ride and more stable handling of the vehicle.

It is well known in the prior art that wheeled vehicles such as trucks which are designed to carry heavy loads are relative hard riding and under a heavy load the steering is unstable.

Heretofore, several patents have been issued attempting to provide a smooth ride with stable steering. Such patents are U.S. Pat. Nos. 3,031,179; 3,063,732; and 4,397,478. These patents lead to a smooth ride, however, they do not have the best steering which is desired by a driver of the vehicle.

This invention makes use of a direct air-ride suspension which is installed between a commonly used leaf spring and the frame of the body at the rearmost end of the leaf spring. The leaf spring is secured at its rearward end by slide pads and a self locking bolt so that the rearmost end of the spring will slide along the rear hanger.

It is therefore an object of this invention to provide an air-suspension in combination with a leaf spring which provides a smooth ride with better handling and control of the steering of the vehicle.

Another object is to provide an air-suspension in combination with a normally used leaf spring which makes use of the original equipment manufactured, OEM, without any alteration of the OEM.

Yet another object is to provide an air-suspension in combination with a leaf spring in which the air spring is easily and quickly installed on the vehicle.

Still another object is to provide an air-spring suspension which may be easily installed by unskilled as well as skilled persons without any problems.

The invention will be better understood and further objects and advantages thereof will become more apparent from the ensuing detailed description of preferred embodiments taken in conjunction with the drawings.

BRIEF DESCRIPTION OF THE DRAWINGS

FIG. 1 is a perspective view of the air-spring, leaf spring combination shown mounted onto a truck frame and axle;

FIG. 2 illustrates the rear bracket secured to the frame with the side brackets, slide pads and self locking bolt which are used to support the rear end of the leaf spring taken along line 2—2 of FIG. 1 and shown in cross-section;

FIG. 3 is an enlarged view illustrating the leaf spring, the air spring, support brackets, spring links, the slide pads and the self locking bolt all in place with the brackets secured to the frame; and FIG. 4 is a cross sectional view of the links, slide pads, the end connection of the spring and the self locking bolt along line 4—4 looking downward from the frame of the vehicle.

DETAILED DESCRIPTION

Now referring to the drawings wherein like reference characters refer to like parts there is shown in FIG. 1 a perspective view of the air-spring system in accordance with this invention. The leaf spring 10 is shown connected to a front bracket 12 which is secured to the frame 8 so that the spring is pivotable about a support bolt 14 in a well known manner. The leaf spring is secured to the axle 16 by a well known support bracket 18. The rear end of the leaf spring which may include a bushing is secured between a pair of stabilizer links 22, as shown in cross-section in FIG. 4, which are secured at their upper end via an aperture 23 to a bracket 24 by any well known pin or bolt 20 which is secured to the frame 8 of the vehicle. In order to permit movement of the rear end of the leaf spring relative to the stabilizer links 22 and to stabilize the control of the vehicle, the links are provided with elongated slots 30 which extend from near the bottom end of the links to a point below the upper end connection to the frame. Two pair of inner and outer slide pads 25 are provided which slide along the inner and outer surfaces of the links as the end of the leaf spring moves up and down so that these slide pads assist in stabilizing the control of the vehicle. The slide pads may be made of metal, polytetrofluorethylene or any other suitable material. One pair of slide pads are used on each side of each of the stabilizer links and a bolt 26 is used to secure the slide pads and the end of the leaf spring in place. One slide pad for each stabilizer link is placed on the bolt between the outer edge of the leaf spring bushing 28 and the inner surface of each of the stabilizer links and a slide pad is placed between the bolt head 31 and the outer side of one stabilize link and between a self locking nut 32 and an outer surface of the other stabilizer link. The slide pads on the outside of each of the stabilizers seat between edge supports 38 on each side of the stabilizers. The bolt head is provided with a grease fitting 34 and a grease channel 36 for applying grease to the spring bushing. The surfaces between the slide pads and the stabilizer links are also greased.

The stabilizer links are formed with a somewhat U-shaped channel with cross section as shown in FIG. 4 in order to provide side-wise edge supports 38 for the slide pads. The edge supports 38 also functions to aid in stabilizing the handling of the truck by the driver.

An air spring 40 is secured between an upper bracket 42 which is secured to the frame and a lower bracket 44 which is secured to the upper surface of the leaf spring as near the outer edge of the leaf spring bushing 28 as possible. The air spring connects with an air control leveling valve 46 which connects to an air supply 48 via an adjustable pressure regulator 52. The air control leveling valve is controlled by a lever connection 54 connected with the axle of the vehicle or to the spring bracket 18. The air control leveling valve operates to permit air flow to the air spring if the vehicle body is too low and to release air from the air-spring if the vehicle body is too high. Thus, the air control leveling valve operates to maintain the vehicle body in a normal position.

The front end of the leaf spring is pivotable about the OEM pin 14 and the rear end of the leaf spring is slidable along the support links with the slide pads movable along the inner and outer surfaces of the supporting links. The bolt 26 supports the slide pads and the rear end of the spring. The nut 32 on the bolt 26 is a self locking nut so it can be tightened to a proper tightness to permit the slide pads to slide along the stabilizer links. The stabilizer links, slide pads and bolt 26 all cooperate to provide a stable alignment of the spring which will provide improved stability by controlling any side motion.

The above arrangement has been described using a single leaf spring-air-spring. Obviously each side of the front end suspension will be equipped with the above described elements and connections. Each of the air springs for each side of the vehicle will be provided with its own pressure control regulator and air control leveling valve.

Since the air-spring, air-spring controls, air-spring supporting brackets, supporting links, slide pads and bolt with a self locking nut are all used with an OEM leaf spring and support bracket, the additional elements as set forth by this invention may be packaged and sold as a kit which is to be added to the OEM already on the vehicle. Some vehicles are already equipped with an air-spring; therefore, for these vehicles it is only necessary to include the stabilizer brackets, slide pads and bolt with a self-locking nut with instructions to install the air-spring as close to the rear end support of the leaf spring as possible.

By adding the air spring near the rear end support of the leaf spring, the leverage is less than in the prior art. The elements are not used with an extra equalizer but is a direct air-ride suspension usable with OEM front leaf springs.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An improved air spring suspension system for a wheeled vehicle including a frame, first and second leaf springs each including a front end and a rear end, the front end of said first and second leaf springs being secured to first and second brackets, respectively, which are secured to opposite sides of said frame, each of said first and second leaf springs being secured to a front axle approximately at a mid-point of each of said leaf springs between their front end and their rear end, an air pressure source, an adjustable air pressure regulator secured to a pressure line from said air pressure source, an air control height leveling valve connected with said air pressure regulator on the same side of said vehicle, and a third and fourth bracket connected to each side of the frame for connecting a rear end of said first and second leaf springs, the improvement including;

a first and second pair of slotted stabilizer links secured at one end to each of said third and fourth brackets on each side of the frame for securing the rear end of each of said first and second springs with said frame, each of said stabilizer links having a somewhat U-shaped channel in cross-section with edge supports (38) that extend along their entire length;
   a first and second bolt that secures the rear end of each of said first and second leaf springs to said first and second pairs of slotted stabilizer links;
   a self locking nut for each of said first and second bolts;
   an inner and an outer slide pad on each of said first and second bolts on each side surface of each of said slotted stabilizer links of each of said first and second pairs of slotted stabilizer links, each of said inner and outer slide pads are rectangular in shape and slide along and within said edge supports (38) of said U-shaped stabilizer links;
   an air-spring on each side of said frame;
   an upper bracket secured to said frame at an upper end of each of said air-springs;
   a lower bracket at a lower end of each of said air springs secured to said leaf spring;
   said upper and lower brackets being positioned to secure each of said air springs juxtaposed said first and second pair of slotted stabilizer links, and
   said air-springs are connected to one each of said air control leveling valves.

2. An improved air spring suspension system as set forth in claim 1, in which said first and second bolts include a grease fitting, a grease passage and an opening for grease to flow from said bolts to grease the rear end of the first and second leaf springs.

3. An improved air spring suspension system as set forth in claim 1, in which said slide pads are made of polytetrofluorethylene.

4. A kit for suspending the rear end of a pair of leaf springs of a front end suspension system of a wheeled vehicle from a pair of brackets (24) secured to a frame (8) of said vehicle, including an air spring on each leaf spring, which comprises,
   two pair of stabilizer links (22) with each link having a slot (30) therein, each stabilizer link having a somewhat U-shaped channel in cross-section with edge supports (38) which extend along its entire length and upper and lower ends,
   said upper end of each of said slotted stabilizer links including an aperture (23) therein for securing each pair of said stabilizer links to said bracket (24) secured to said frame (8) of each side of said vehicle with each pair of said stabilizer links having a greater spacing therebetween than a width of said rear end of said spring;
   a pair of bolts;
   one each of said pair of bolts passing through said slot (30) in each pair of said stabilizer links and through said rear end of one of said leaf springs;
   a self locking nut for each bolt of said pair of bolts;
   four pair of rectangular-shaped slide pads,
   each pair of said pads adapted to be placed on one of said bolts alongside inner and outer surfaces of each of said stabilizer links for sliding alongside each of said stabilizer links and along and within said edge supports (38) of each of said U-shaped stabilizer links when assembled.

5. A kit for suspending the rear end of a pair of leaf springs of a front end suspension system of a wheeled vehicle from a pair of brackets secured to a frame of said vehicle, which comprises:
   two pair of stabilizer links (22) with each link having a slot (30) therein, each stabilizer link having a somewhat U-shaped channel in cross-section with edge supports (38) which extend along its entire length and upper and lower ends,
   said upper end of each of said slotted stabilizer links including an aperture (22) therein for securing each pair of said stabilizer links to said bracket (24) secured to said frame (8) of each side of said vehicle with each pair of said stabilizer links having a greater spacing therebetween than a width of said rear end of said spring;
   a pair of bolts;

one each of said pair of bolts passing through said slot (30) in each pair of said stabilizer links and through said rear end of one of said leaf springs;

a self locking nut for each bolt of said pair of bolts;

four pair of rectangular-shaped slide pads, each pair of said slide pads adapted to be placed on one side of said bolts alongside inner and outer surfaces of each of said stabilizer links for sliding alongside each of said stabilizer links and along and within said edge supports (38) of each of said U-shaped stabilizer links when assembled a pair of air springs;

each of said air springs being placed between a bracket on said frame and a bracket on one each of said leaf springs juxtaposed said pair of stabilizer links;

at least one adjustable air pressure regulator;

at least one air control leveling valve; and control means for controlling said air control leveling valves.

* * * * *